US007123766B2

(12) United States Patent
Mao et al.

(10) Patent No.: US 7,123,766 B2
(45) Date of Patent: Oct. 17, 2006

(54) METHOD AND SYSTEM FOR RECOGNIZING AND SELECTING A REGION OF INTEREST IN AN IMAGE

(75) Inventors: Fei Mao, Scarborough (CA); Terrance Callahan, Aurora (CA)

(73) Assignee: Cedara Software Corp., Ontario (CA)

( * ) Notice: Subject to any disclaimer, the term of this patent is extended or adjusted under 35 U.S.C. 154(b) by 501 days.

(21) Appl. No.: 10/071,240

(22) Filed: Feb. 11, 2002

(65) Prior Publication Data

US 2003/0152262 A1  Aug. 14, 2003

(51) Int. Cl.
*G06K 9/00* (2006.01)
*G06T 15/00* (2006.01)

(52) U.S. Cl. ........................ 382/154; 345/419

(58) Field of Classification Search ................ 382/154, 382/285, 173–180; 345/419–427; 356/12–14; 348/42–60; 359/462–477; 352/57–65; 33/20.4; 353/7–9; 378/41–42; 396/324–331
See application file for complete search history.

(56) References Cited

U.S. PATENT DOCUMENTS

| | | | |
|---|---|---|---|
| 5,056,066 A * | 10/1991 | Howard | 367/72 |
| 5,903,664 A * | 5/1999 | Hartley et al. | 382/154 |
| 6,453,069 B1 * | 9/2002 | Matsugu et al. | 382/173 |
| 6,577,752 B1 * | 6/2003 | Armato et al. | 382/131 |
| 6,606,091 B1 * | 8/2003 | Liang et al. | 345/424 |
| 6,690,816 B1 * | 2/2004 | Aylward et al. | 382/128 |
| 6,694,163 B1 * | 2/2004 | Vining | 600/407 |
| 6,704,439 B1 * | 3/2004 | Lee et al. | 382/131 |
| 6,828,966 B1 * | 12/2004 | Gavriliu et al. | 345/420 |
| 6,898,303 B1 * | 5/2005 | Armato et al. | 382/131 |
| 2002/0090121 A1 * | 7/2002 | Schneider et al. | 382/128 |
| 2003/0068074 A1 * | 4/2003 | Hahn | 382/128 |
| 2003/0174872 A1 * | 9/2003 | Chalana et al. | 382/128 |

OTHER PUBLICATIONS

Pratt, William K. "Digital image processing." 1991, pp. 608-610.
Jain, Anil K. "Fundamentals of digital image processing." 1989, pp. 412-414.
Pohle, Regina et al. "Segmentation of medical images using adaptive region growing." Proceedings of SPIE vol. 4232, 2001, pp. 1337-1346.
Yi, Jaeyoun et al. "Vascular segmentation algorithm using locally adaptive region growing based on centerline estimation." Proceedings of SPIE vol. 4322, 2001, pp. 1329-1336.

* cited by examiner

*Primary Examiner*—Jingge Wu
*Assistant Examiner*—Aaron Carter
(74) *Attorney, Agent, or Firm*—Harness, Dickey & Pierce, P.L.C.

(57) ABSTRACT

A method and system for recognizing and selecting a portion of an image. The method and system employs user-controlled region growing to select a region within an image. The user manipulates a user input device to interactively increase or decrease the number of iterations performed by a region growing routine. The progress of the growth of the region is displayed to the user on a display. In the case of a three dimensional image, the user may select sectional or volume views of the image within which to monitor the growth of the region. Once the user determines an appropriately sized region has been grown, the remainder of the image is scalpelled away and the selected region is displayed on the display. Alternatively, the region is scalpelled away and the remainder of the image is displayed on the display.

26 Claims, 17 Drawing Sheets

METHOD AND SYSTEM FOR RECOGNIZING AND SELECTING A REGION OF INTEREST IN AN IMAGE

FIELD OF THE INVENTION

The present invention relates generally to a method and system for recognizing and selecting at least one region of interest in an image.

BACKGROUND OF THE INVENTION

Computer-generated images find use in many different industries to model surfaces and solids. In the medical field, computer imaging is used in combination with ultrasound imaging, magnetic resonance imaging or other medical imaging technology to display, analyze and organize the data these medical imaging technologies provide. For example, ultrasound machines use ultrasonic wave, i.e. sonar, to scan a patient's body. The data thus obtained is then analyzed by physicians to assist the physicians in their diagnosis and treatment of patients. Ultrasound can be used to view a fetus, blood-flow patterns in arteries, or to scan organs for irregularities such as cysts, etc.

Typically, a three dimensional image is displayed to a user by being projected on a two dimensional surface such as a screen or a print out. Computer systems have been devised that permit the user to take different cross-sectional views of the image, thereby enabling a user to view a portion of the three dimensional image by choosing one or more cross-sectional views. Some computer systems permit the user to geometrically transform the image by rotating, translating and scaling the image, and also permit the user to take cross-sectional views at different orientations, such that the user can sequentially view the three-dimensional image using a series of oblique planes. Other computer systems take a different approach; instead of showing a cross-section of the three dimensional image, they "render" the volume by making part of the volume transparent or translucent such that points under those parts are revealed. In a maximum intensity display, for example, the highest intensity points along a line parallel to the line of sight of the user are shown, similar to an x-ray picture of a foot.

While three dimensional images provide a wealth of information, filtering out the information that is of interest from irrelevant information can be very time-consuming. This is especially the case for medical images in which the feature of interest is often obscured from clear view by other physical features. A typical method of eliminating irrelevant portions of three-dimensional images is through user selection of portions of the image to scalpel away from a displayed view of the image. Based upon one or more displayed views of the image, the user selects a series of points defining an enclosure. In a two-dimensional image, the selected points define a shape, whereas in a three-dimensional image, the selected points define a volume. The image processing system then eliminates any image data within the selected enclosure and re-displays the view(s) of the image. The user may then select points to define another enclosure to eliminate. In such a manner, the user pares away unwanted portions of the image. Among the disadvantages of this method are the time required of the user to select the enclosures and the difficulty of accurately selecting the unwanted areas without also scalpelling away portions of the feature of interest.

Accordingly, there remains a need for a system and method of quickly and easily analyzing and manipulating computer-generated images in order to filter out as much irrelevant information as possible from the images and display only the region of interest.

BRIEF SUMMARY OF THE INVENTION

In one aspect, the present invention provides a method of selecting a portion of an image, the portion of the image containing a feature of interest, a view of the image being displayed on a display, the image being generated from an image-defining array containing image data corresponding to image properties at points within a coordinate system containing the image, the image-defining array being stored by an image processing system, and a user having a user interface means for interaction with the image processing system, the method including the steps of determining a seed point in the image defining array in response to the selection by the user of a pixel in the view of the image being displayed, and growing a region about the seed point, wherein the growth of the region is responsive to the user interface, such that manipulation of the user interface selectively determines the extent of the growth of the region.

In a further aspect, the present invention provides a method of selecting a desired portion of an image, as described above, wherein the step of growing a region includes an iterative series of steps, including the steps of evaluating untested points in the image defining array adjacent to a boundary member point to determine if each untested point is a member of the region, the boundary member point being the seed point for a first iteration and the boundary member point being a member point at the boundary of the region for subsequent iterations; adding to the region those untested points that are determined to be members of the region; excluding from the region those untested points that are determined not to be members of the region; and visually distinguishing, on the view of the image being displayed, the points determined to be members of the region from other points, and wherein the number of iterations performed is responsive to the user interface means, such that manipulation of the user interface means selectively determines the extent of the growth of the region.

In yet another aspect, the present invention provides an image processing system for selecting a portion of an image, the portion of the image containing a feature of interest, a view of the image being displayed on a display, the image being generated from an image-defining array containing image data corresponding to image properties at points within a coordinate system containing the image, the image-defining array being stored by the image processing system, a seed point in the image defining array being determined based upon the selection by a user of a pixel in the view of the image being displayed, the image processing system including a user interface for selecting the pixel and for selectively determining the extent of the growth of a region, and a region growing module for growing the region about the seed point, the region growing module increasing and decreasing the growth of the region in response to manipulation of the user interaction means, wherein the view of the image being displayed shows the size of the region.

In yet another aspect, the present invention provides a computer program product comprising a computer readable medium carrying program means for selecting a desired portion of an image, the desired portion of the image containing a feature of interest, a view of the image being displayed on a display, the image being generated from an image-defining array containing image data corresponding to image properties at points within a coordinate system containing the image, the image-defining array being stored by an image processing system, and a user having a user interface means for interaction with the image processing system, the computer program product including code means for determining a seed point in the image defining array in response to the selection by the user of a pixel in the view of the image being displayed; code means for iteratively growing a region about the seed point, wherein the number of iterations performed is responsive to the user interface means, such that manipulation of the user interface means selectively determines the extent of the growth of the region; and code means for displaying a view of a portion of the image corresponding to the region.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Reference will now be made, by way of example, to the accompanying drawings, which show preferred aspects of the present invention, and in which.

DETAILED DESCRIPTION OF AN EMBODIMENT OF THE INVENTION

The present invention comprises a system and method for recognizing and selecting a region of interest in an image. In one embodiment, the system and method employs a perspective view and selectable sectional views to assist the user to recognize a feature of interest and to identify unwanted features. The system and method also employs region growing to select a region containing the feature of interest and excluding the unwanted artifacts. The region growing proceeds by iterative growth steps, the number of steps being controlled by the user through a user interface device.

Figure 1:
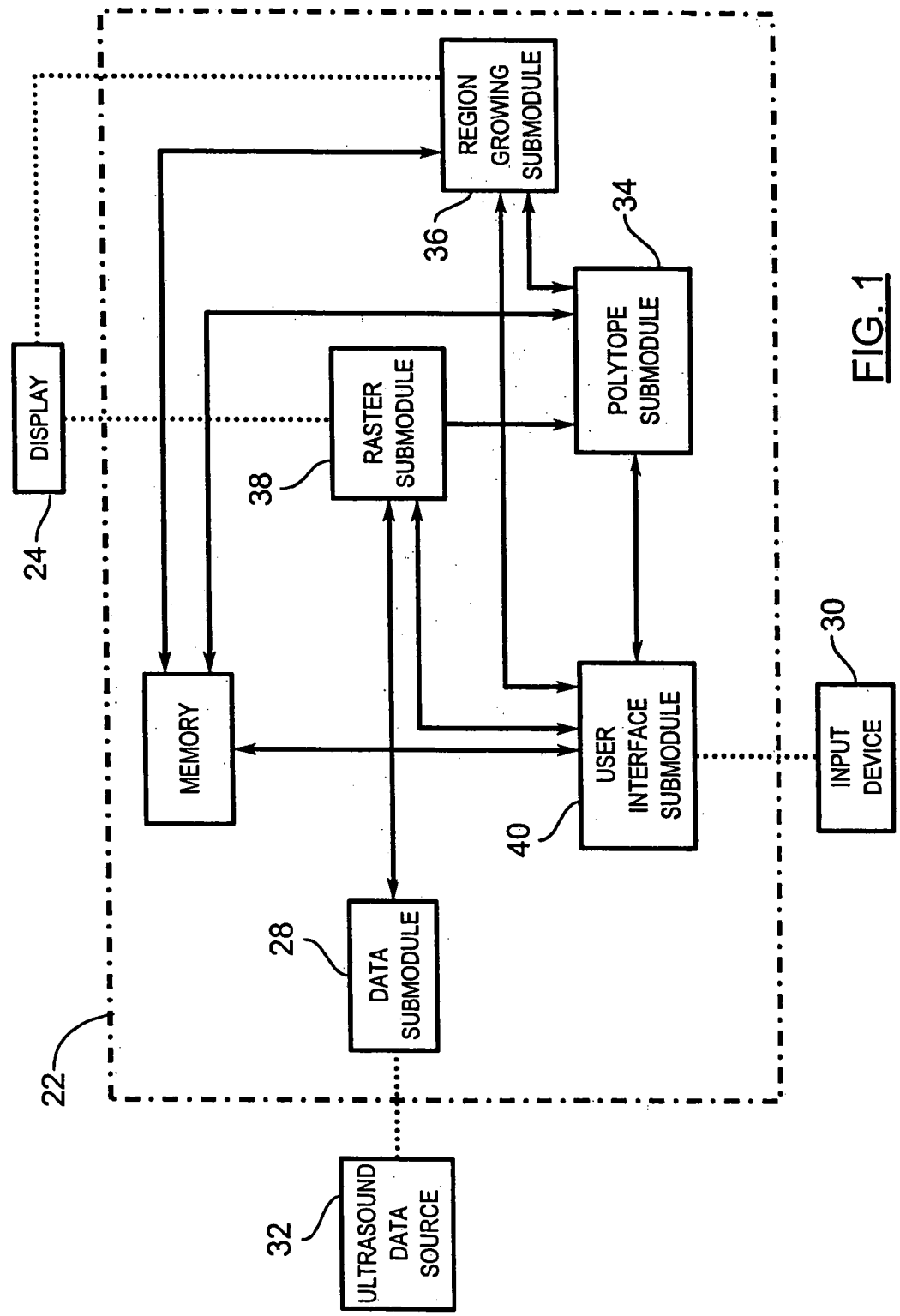
FIG. 1 is a block diagram showing an optimal view selection system according to an aspect of the present invention.

Referring to FIG. 1 there is illustrated a block diagram of a computer system 22 for analyzing computer-generated three dimensional images in accordance with a preferred embodiment of the invention. As shown in FIG. 1, the computer 22 is connected to a display 24 (for example, a 640 by 480 screen), an input device 30 such as a manually operated mouse 30, and an ultrasound image data source 32 such as an ultrasound system that acquires ultrasound image data.

When scanning a patient, an ultrasound operator passes a probe over a portion of the patient's body. The probe emits and receives a series of ultrasonic waves. Based on the difference between the ultrasonic waves that are emitted and those that are received, a frame of data representing a cross-sectional view of the patient's body is obtained along the path of the probe. The probes generates, say, 150 frames of data in a typical pass over the scanned portion of the patient's body. Each frame of data represents a cross-section of the part of the patient's body that is scanned using ultrasonic waves. Each frame is typically 640 by 480 pixels, but only a portion of the frame corresponding to the area of interest, which is typically about 250 by 250 pixels, is stored. Accordingly, the image data in the ultrasound image data source 32 for a single image would consist of about 150 frames, each frame being about 250 by 250 pixels.

The image data source 32 communicates with the computer 22 and provides image data to a data submodule 28 of the imaging software (not represented in the block diagram of FIG. 1) on the computer 22. The data submodule 28 orders the image data in an image data array, such that each ordered image property in the image data array has associated spatial coordinates. The x and y spatial coordinates are determined by the location of the data within the 250 by 250 frame, while the z spatial coordinate is assigned to the data by the data submodule 28 based on the frame in which the data is found.

In order to form three dimensional images based on the ultrasound data for image data received from the ultrasound image data source 32, the computer 22 includes a conventional polytope submodule 34 for generating a coordinate space. Preferably, the coordinate space takes the form of a right-angled parallelepiped, which will be referred to as modelPoly (where "poly" is an abbreviation of "polyhedron"). The modelPoly is defined around the origin of a left-handed xyz coordinate system.

The polytope submodule 34 handles all of the geometry involved in rotating, translating and scaling modelPoly. The calculations involved in geometrically transforming the coordinate space are more easily performed when modelPoly remains located about the origin. Accordingly, all of the geometry involved in rotating, translating and scaling modelPoly is recorded in a rotation matrix R, a translation matrix T and a scaling matrix S, while modelPoly itself remains located about the origin. ModelPoly is rotated, translated and scaled by the matrices R, T and S to form a winpoly. It is winPoly as projected on the screen of the display 24 that the user sees. Initially, the matrices R, T, and S do not specify any rotation, translation or scaling of winPoly as compared to modelPoly. Then the user gradually adds information to each of R, T and S by performing sequences of geometrical transformations on winPoly. Say, for example, that the user rotates winPoly, thereby changing the visible face of winPoly (by convention, visible faces are defined by a line of sight that is parallel to the z coordinate axis and is negative). This rotation information is recorded in $R_1$ by multiplying $R_0$ by a matrix representing the rotation of winPoly ($R_1$ in this case–$R_0$ is the rotation matrix after n distinct rotations have been applied to modelPoly) Subsequently, winPoly is rotated again; this information is recorded in $R_2$ by multiplying $R_1$ by a matrix representing this second rotation of winPoly (the matrix generated by $R_1^{-1}*R_2$ in this case).

Some operations such as slicing and pivoting are recorded on modelPoly itself and not in the matrices that transform modelPoly to winPoly. These operations determine the clip state of modelPoly; that is, these operations determine all of current surfaces of modelPoly. Initially, this clip state includes the six faces and eight vertices of the parallelepiped. A new surface can then be added by slicing in from one of the original six planes along the normal of such original face to generate a new surface parallel to such original face. Then the original face can be discarded by cutting in from the first-added surface. A new surface can also be generated by pivoting about an arbitrary axis on one orignial face. After this pivoting operation, the clip state would include the six initial faces and the new added surface.

After modelPoly is rotated, translated and scaled by the matrices R, T and S to form winpoly, the coordinates of the visible faces of winPoly are projected to a two-dimensional image with lines connecting adjacent coordinates. The two-dimensional projection of winPoly is then sent to a raster submodule 38 (FIG. 1). The raster submodule 38 maps image data onto the two-dimensional image of each visible faces of winPoly, by, for each ordered image property of the image data array that has associated coordinates on a visible surface, mapping such ordered image property onto such associated coordinates. First, the projected face is broken up into contiguous, 2 dimensional triangles. Next, each triangle is filled by first identifying the minimum y value and the maximum y value that lie in the triangle. Then, for these two points, and for each y value falling between these two points, a line segment is determined. One end of this line segment is a point having the smallest x integer value falling inside the triangle, while the other end is a point having the largest x integer value falling inside the triangle. The ordered image properties having associated spatial coordinates corresponding to this line segment are then mapped onto the line segment by the raster submodule.

The projected two dimensional image of winPoly is projected onto the screen of the display 24 where it can be seen by the user. Using the input device 30, the user can send commands to a user interface submodule 40, where these commands are interpreted and transmitted to the polytope module 34. These commands include translate, rotate or scale, winPoly, in which case the polytope submodule 34 updates the matrices T, R and S as required. Alternatively, these commands include slice or pivot surfaces of modelPoly, in order to add new surfaces to modelPoly. These new surfaces of modelPoly will also appear in winPoly, after being rotated, translated and scaled by R, T and S, and from winPoly will be projected onto a two dimensional surface to be displayed on the display 24.

The above-described geometrical manipulation as well as surface generation using slicing and pivoting are well known to those skilled in the art of medical imaging and are widely used. Accordingly, no further detail regarding these imaging techniques will be provided herein. Using the above-described computer system, users can generate a series of sectional views, which may be parallel to one of the originally six faces or may be oblique sectional views. These sectional views can then be reviewed by a physician or other suitably skilled person to identify points of interest. Those sectional views that include points of interest will typically be retained by the physician, who will use them to help make a diagnosis.

When reviewing image data using the computer 22, a user interacts with winPoly as displayed on the display 24, by translating, rotating and scaling winPoly, and by slicing or pivoting surfaces of modelPoly, which sliced and pivoted surfaces are automatically mapped onto winPoly.

Figure 2:
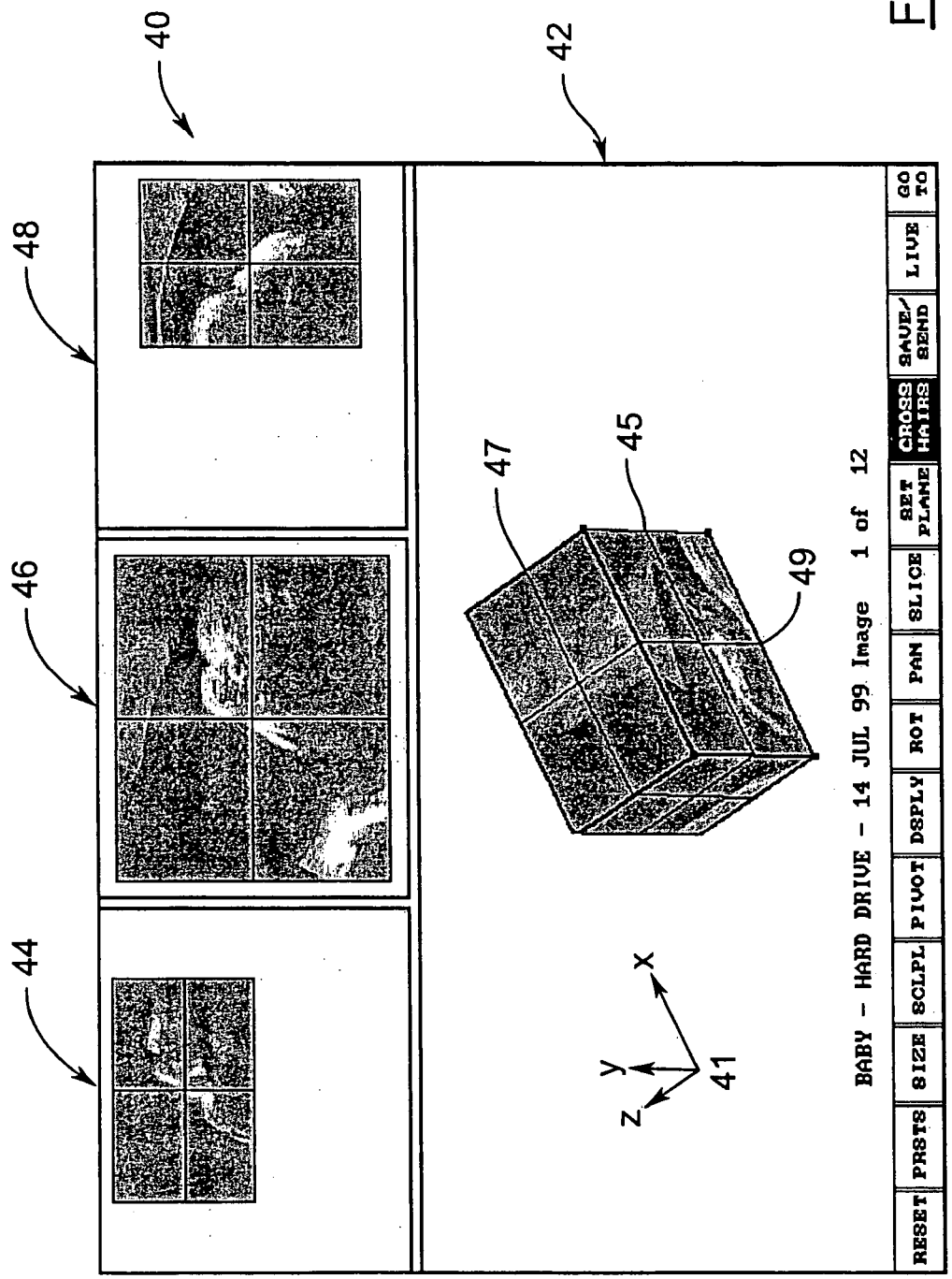
FIG. 2 is a screen shot showing features of a graphical interface for a system according to an aspect of the present invention.
Figure 3:
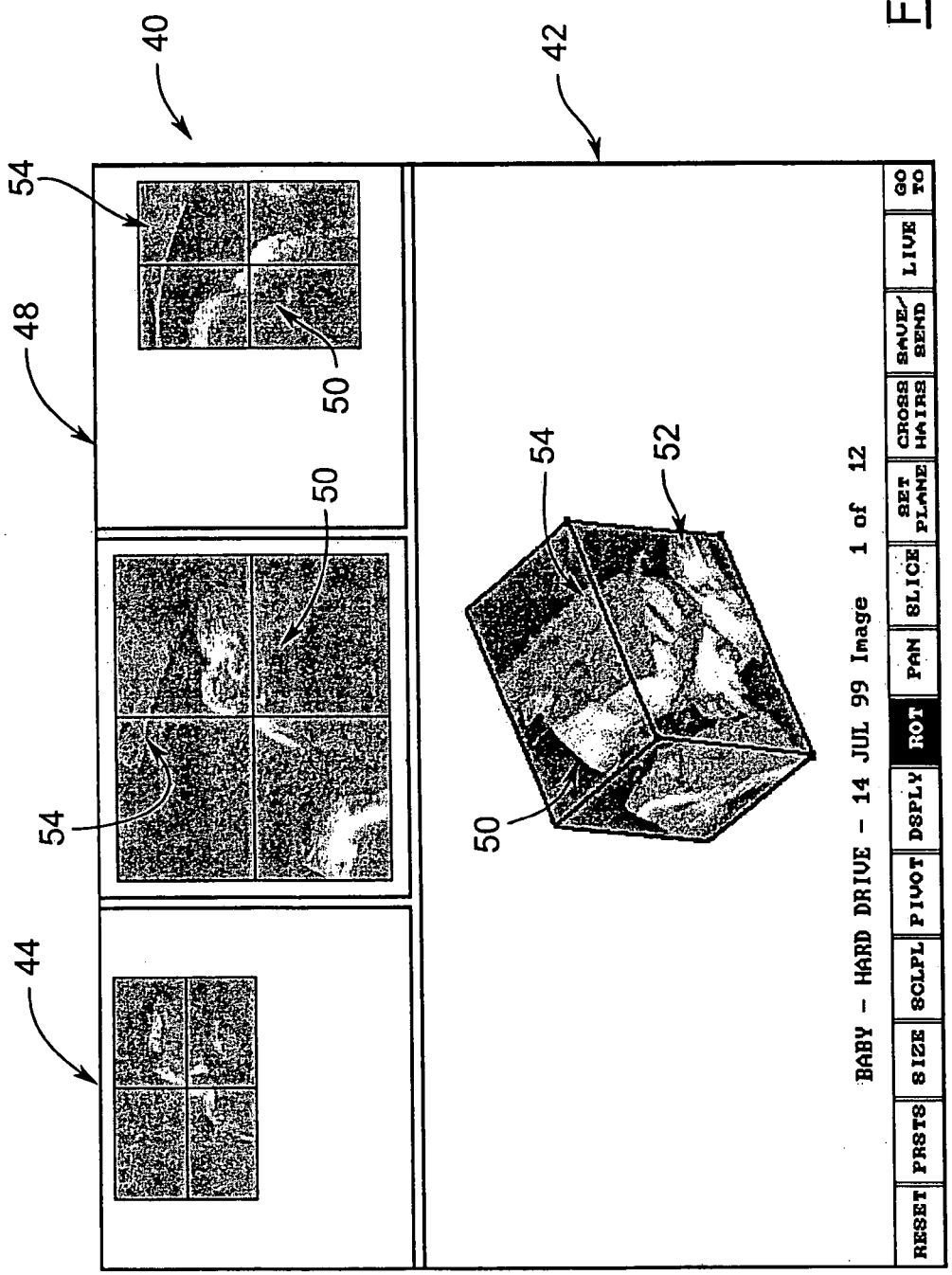
FIG. 3 is a screen shot showing features of a graphical interface for a system according to an aspect of the present invention.

In one embodiment, as shown in FIG. 2, the display 24 shows a graphical interface 40 which includes a volume view 42 and three individual sectional views 44, 46 and 48. The volume view 42 shown in FIG. 2 contains a rectangular volume, the three visible sides of which comprise individual visible faces of winPoly displayed in perspective, as created by the raster submodule 38 (FIG. 1). Each visible face of the rectangular volume also shows a set of orthogonal cross-hairs. Each cross-hair represents a sectional plane 45, 47 and 49 through the three dimensional image, the three orthogonal sectional planes intersecting within the three dimensional image. Each sectional view 44, 46 and 48 is a display of a respective sectional plane 45, 47 and 49 corresponding to the cross-hairs shown in the volume view 42. In particular, using an x-y-z orthogonal coordinate system 41, wherein the y-axis extends towards the top of the volume view 42, the x-axis extends towards the right side of the volume view 42, and the z-axis extends to the upper left of the volume view 42 (nationally, into the display 24), it will be understood that the sectional view 46 corresponds to a sectional in a constant-z plane 47. Similarly, the sectional view 44 corresponds to a sectional in a constant-y plane 45 and the sectional view 48 corresponds to a sectional in a constant-x plane 49. In FIG. 3, the graphical interface 40 has a volume view 42 shown in rendered format.

Referring again to FIG. 2, the cross-hairs shown on the visible faces of the rectangular volume in the volume view 42 may be manipulated by the user using the input device 30 (FIG. 1) to adjust their position on the visible faces, and accordingly, adjust the position of the sectional plane through the three dimensional image. The sectional views 44,46 and 48 show slices of the three dimensional volume at the user's selected location. In this manner the user may manipulate the cross-hairs to locate the sectional views 44, 46 and 48 that provide the clearest views of a feature of interest.

A three-dimensional rendering of an image, such as that shown in the rendered volume view 42 in FIG. 3, is typically partially obfuscated by unwanted artifacts. In the case of medical imaging, these unwanted artifacts may include tissues or features unrelated to the feature of interest. The example image shown in FIG. 3 is from a fetal ultrasound scan. The volume view 42 shows a view of the face 50 and part of the torso 52 of a fetus that is partially obscured by the uterus lining 54. The position of the uterus lining 54 above the face 50 of the fetus is seen in the sectional views 46 and 48.

As will now be described in more detail, the present invention comprises a system and method for recognizing and selecting a region of interest in an image. In one embodiment, the system and method employs a volume view and selectable sectional views to assist the user to recognize a region of interest and to identify unwanted artifacts. The system and method also employs user-controlled region growing to select the region of interest and exclude the unwanted artifacts.

Referring again to FIG. 1, the computer system 22 includes a region growing submodule 36. The region growing submodule 36 is responsive to the input device 30 and maintains a growth matrix G containing the selected region. The growth matrix G is used to update a scalpelling matrix C, which the polytope submodule 34 uses as a mask for modelPoly to select the region of interest for display. The region growing submodule 36 implements a region growing routine that grows a three dimensional region in the image starting from a seed point.

Once the user has identified a desirable feature of interest, such as the face of a fetus, and has located sectional views that provide a reasonably clear depiction of the feature of interest showing some separation between it and any unwanted artifacts, the user will then wish to isolate a region containing the feature of interest and scalpel away the remainder of the image. In accordance with a method of the present invention, the user selects a point within the feature of interest on one of the sectional views using the input device 30. The system 22 determines the spatial coordinates in modelPoly corresponding to the display coordinates selected by the user. The selected point is a seed point for region growing.

Techniques for region growing for the selection of an area of interest within an image are known in the art of image processing. Simple region growing begins with a seed point in an image. From the seed point, the region growing routine analyzes each pixel surrounding the seed point and determines whether each pixel is a member of the region. The object of region growing is to select a region within an image based upon homogeneity criteria; thus, the region growing routine determines whether each surrounding pixel is a part of the region based the homogeneity criteria. The homogeneity criteria may specify that a pixel belongs to the region if the gray value of the pixel falls within a range of gray values which is based upon the gray value of the seed point. The range used depends upon the specific type of image being analyzed.

After a first iteration, the region growing routine will have determined whether or not the pixels immediately surrounding the seed point are members of the region or not. The next iteration and each subsequent iteration performs the same analysis for the pixels immediately adjacent the region identified in the previous iteration. Accordingly, the region expands outwards with each iteration until the routine determines that none of the surrounding pixels are members of the region. At each pixel along the edge of the region where the adjacent non-member pixels do not satisfy the homogeneity criteria, the region growing routine may be said to have reached a threshold.

Those skilled in the art will be familiar with alternative methods and homogeneity criteria for determining whether a pixel is a member of the region, and with merging regions and other region growing techniques. Similarly, those skilled in the art will appreciate that the use of region growing may be employed in two dimensional images, three dimensional images or higher dimensional images. In a three-dimensional implementation, a region growing routine may analyze the voxels surrounding the seed point in a manner similar to the analysis of the pixels surrounding the seed point in a two-dimensional image.

In conventional image processing, region growing is performed automatically by the region growing routine until the region reaches a threshold in all directions. A disadvantage of this method of segmentation is that the region may grow into unwanted areas if the pixels or voxels between the areas and the region of interest do not present a threshold. Accordingly, reliance on a threshold (homogeneity criteria) to stop the region growing tends to result in selection of unwanted areas due to leakage of the region.

According to this aspect, the present invention provides for direct user control over the extent of the region growing through the input device 30. By manipulating the input device 30, such as a mouse or trackball, the user can control the number of iterations that the region growing routine performs. The physical displacement of the mouse or track ball is identified by the user interface submodule 40 and is used to increase or decrease an iteration variable. The region growing submodule 36 uses the iteration variable to control the number of iterations that the region growing routine performs. Accordingly, beginning from a physical starting point, the user initiates the region growing by moving the mouse or trackball. The movement is detected by the user interface submodule 40, which causes a corresponding increase in the iteration variable. In response to the increased iteration variable, the region growing submodule 36 causes the region growing routine to perform a further iteration, thereby increasing the size of the selected region. By ceasing to move the mouse or trackball, the user may stop the region growing routine even before the selected region reaches a threshold at each boundary point. Moreover, by withdrawing of the mouse or trackball towards its starting point, the iteration variable is decreased, causing the selected region to be retracted to a smaller region. Advantageously, direct user control in conjunction with a display of the growing region allows the user to prevent leakage of the selected region into unwanted artifacts.

In one embodiment, the initial position of the mouse or other input device is recorded by the system 22 when the seed point is selected. Subsequently, the user interface submodule 40 detects movement of the mouse and assesses the direction in which the mouse has been moved as compared to its initial position. The user interface submodule 40 provides data to the region growing submodule 36, the data including whether the mouse has been moved and in what direction. In one embodiment, movement of the mouse to the right or left is indicative of a user instruction to expand or contract the region, respectively. Accordingly, the detection of mouse movement to the right causes the region growing submodule 36 to expand of the region by one or more iterations of the region growing routine, and mouse movement to the left causes the region growing submodule 36 to retract the region by one or more iterations of the region growing routine.

According to another aspect of the present invention, the region growing routine performs a set number of iterations in response to movement of the mouse by the user. For example, upon detecting movement of the mouse to the right, the region growing submodule 36 expands the region by five iterations. Following the fifth iteration, the region growing submodule 36 halts the region growing routine until further movement of the mouse is detected. Upon detecting further movement of the mouse to the right, the region growing submodule 36 causes the region growing routine to perform a further five iterations, and so on. Conversely, upon detecting movement of the mouse to the left after a set of iterations, the region growing submodule 36 causes the retraction of the region by five iterations.

According to yet another aspect of the present invention, the region growing routine 36 includes a size limit which specifies a limit for the number of selected points (pixels or voxels). The region growing routine 36 continues to evaluate points and add selected points to the region until the selected number of points reaches the size limit, then the region growing routine 36 stops the growth of the region. The user controls the size limit through movement of the mouse, as described above. Specifically, the size limit in the case of a two-dimensional image is $N^2$, and in the case of a three-dimensional image is $N^3$, where N is an adjustable integer that may be increased or decreased in increments of 5.

In the event that the region reaches a threshold at one or more boundary points, further movement of the mouse will not cause further expansion of the region at those threshold boundary points. In the event that the region reaches a threshold in all directions, no further expansion of the region is possible.

The growth matrix G and the scalpelling matrix C have a one-to-one correspondence with the modelPoly coordinate space and initially contain null values. Once the user selects a seed point and that seed point is translated to a point in the modelPoly coordinate space, a corresponding point in the growth matrix G is set to 1. As the region grows in the coordinate space in a pattern based upon the image property data contained in modelPoly, the corresponding points in the growth matrix G are set to 1. The scalpelling matrix C is updated at each iteration by the growth matrix G, such that the scalpelling matrix C also contains a logical one at each coordinate system point identified as a member of the region and a logical zero at every other point. During the user-controlled region growing routine, the scalpelling matrix C is used as a mask to black out the points in modelPoly selected as members of the region. The user may monitor the growth of the region by observing the growth of the blacked-out region on the display 24. Following the termination of the region growing routine, the scalpelling matrix C is used as a mask to select only the points in modelPoly that are members of the region. The selected region of the image is then displayed to the user.

The steps of the method and the operation of the system are described in more detail with reference to an example three dimensional image of a fetal ultrasound.

Reference is again made to FIG. 2, which shows a screen shot of the graphical interface 40 upon which is displayed the volume view 42 of the fetal image and the three orthogonal sectional views 44, 46 and 48. In operation, the user adjusts the cross-hairs shown in the volume view 42 until the user recognizes a feature of interest and the feature of interest is clearly visible in one or more of the sectional views 44, 46 and 48. Optionally, the user may choose to have the volume view 42 rendered, as shown in FIG. 3, to assist in identifying the feature of interest and in identifying unwanted artifacts. In the example screen shot shown in FIG. 3, it will be appreciated that the feature of interest is the face 50 of the fetus and that the unwanted artifacts include the uterus lining 54 and other tissues located above the face 50 and to the left of the face 50. The x-y and y-z sectional views 46 and 48 provide a clear view of the fetus' face 50 separate from the unwanted artifacts 54. Accordingly, these views enable the user to select a seed point well within the feature of interest and to monitor the growth of the region. To select a seed point, the user positions a mouse pointer or other input device indicator within one of the sectional views 44, 46 and 48 at the desired point and selects it using the mouse button.

Figure 4:
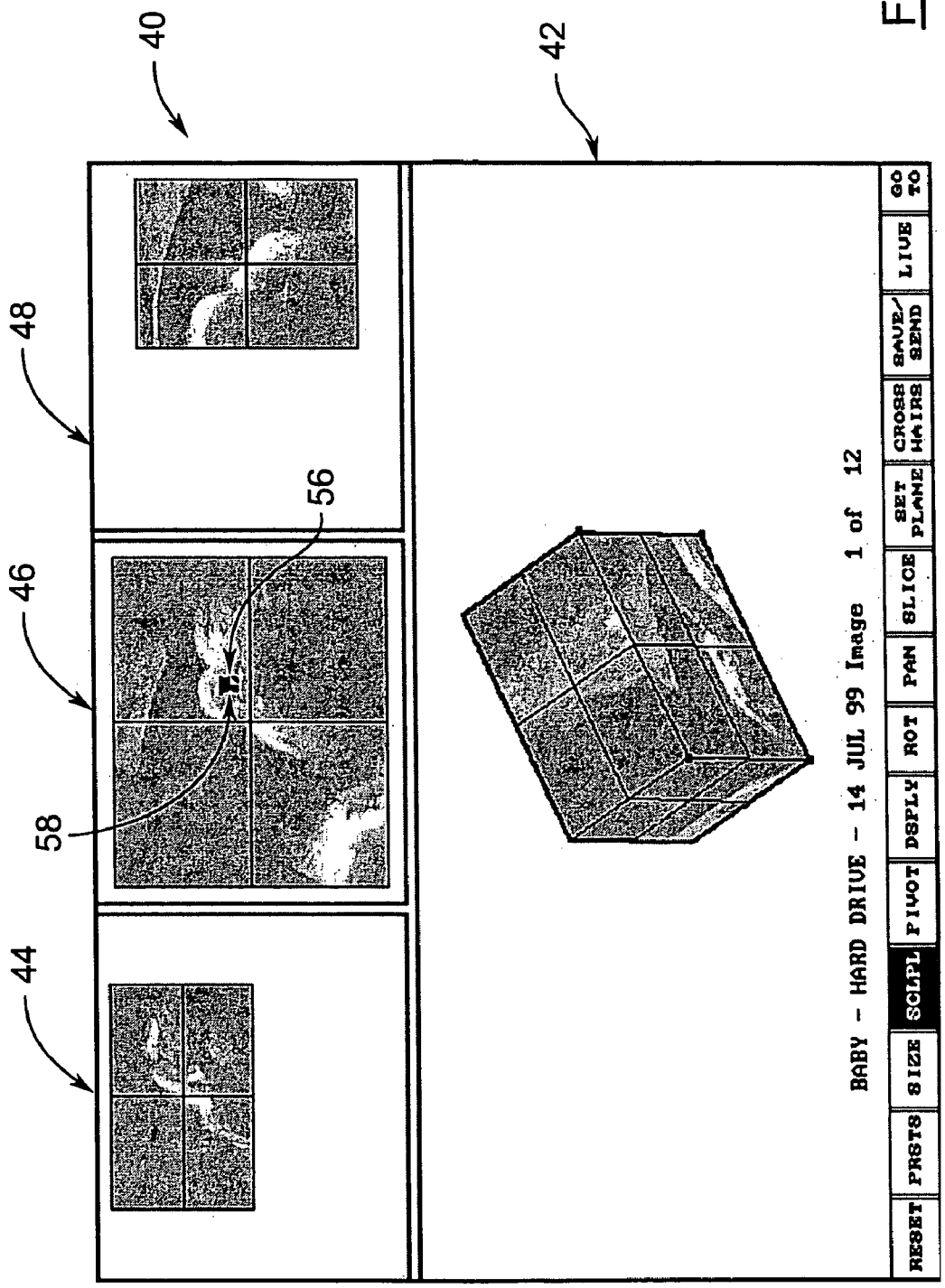
FIG. 4 is a screen shot showing features of a graphical interface for a system according to an aspect of the present invention.

Reference is next made to FIG. 4, which shows a screen shot of the graphical interface 40 including a mouse pointer 56 located near the center of the x-y sectional view 46. The user has selected a seed point at the position of the mouse pointer 56 shown in FIG. 4. A small dark region 58 is visible about the seed point, indicating that the mouse (not shown) has been moved a small distance causing a small growth in the region 58. Each dark pixel in the small dark region 58 is a pixel that has been blacked out because the corresponding point in the coordinate space has been identified as a member of the selected region.

Figure 5:
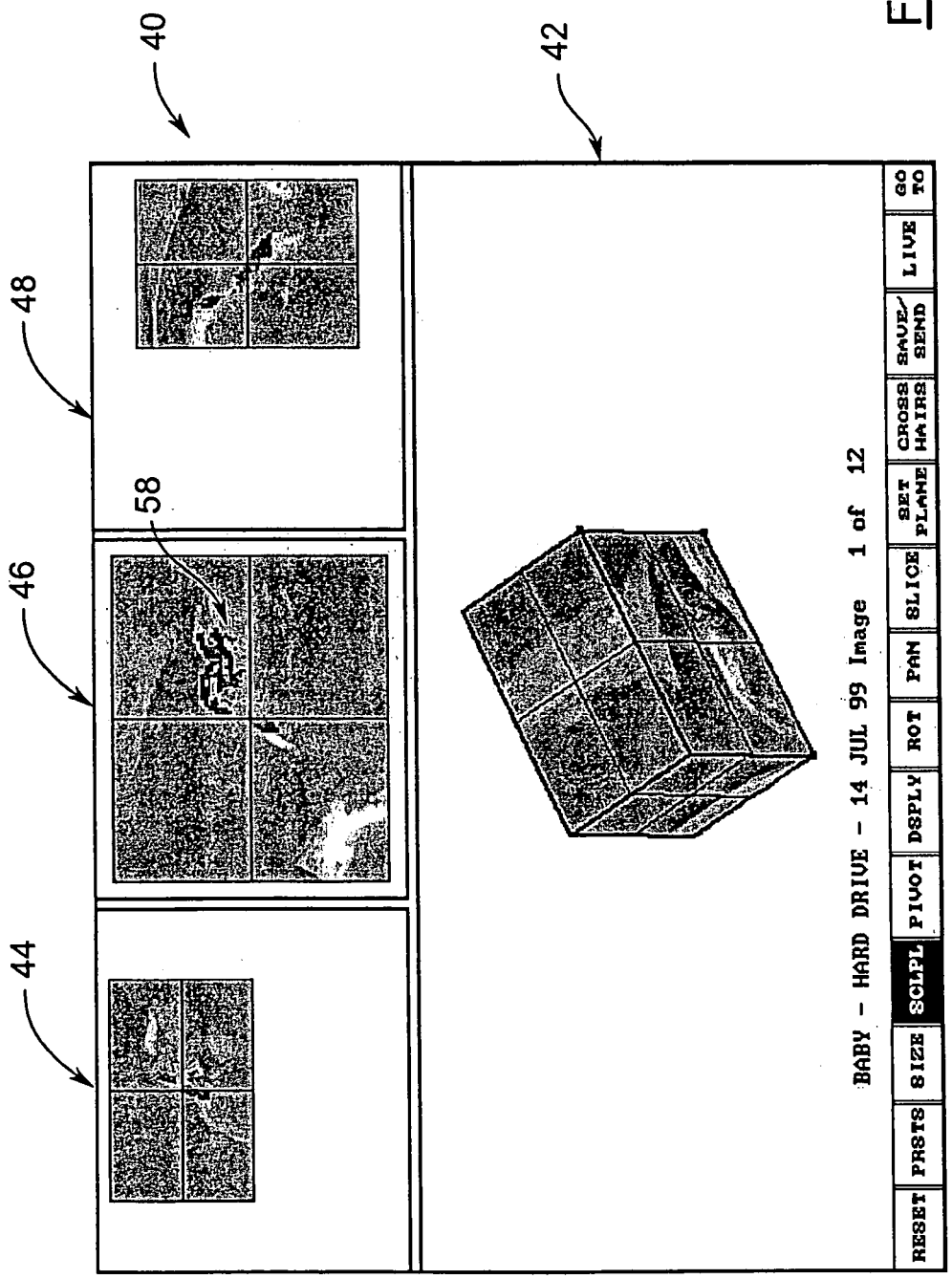
FIG. 5 is a screen shot showing features of a graphical interface for a system according to an aspect of the present invention.

Reference is next made to FIG. 5, which shows a screen shot of the graphical interface 40 after further growth of the selected region. The dark area 58 indicating points selected as members of the region has grown larger in response to further physical movement of the mouse (not shown) by the user. The dark area is now visible in each of the three sectional views 44, 46 and 48, allowing the user to monitor the growth of the selected region in each plane.

Figure 6:
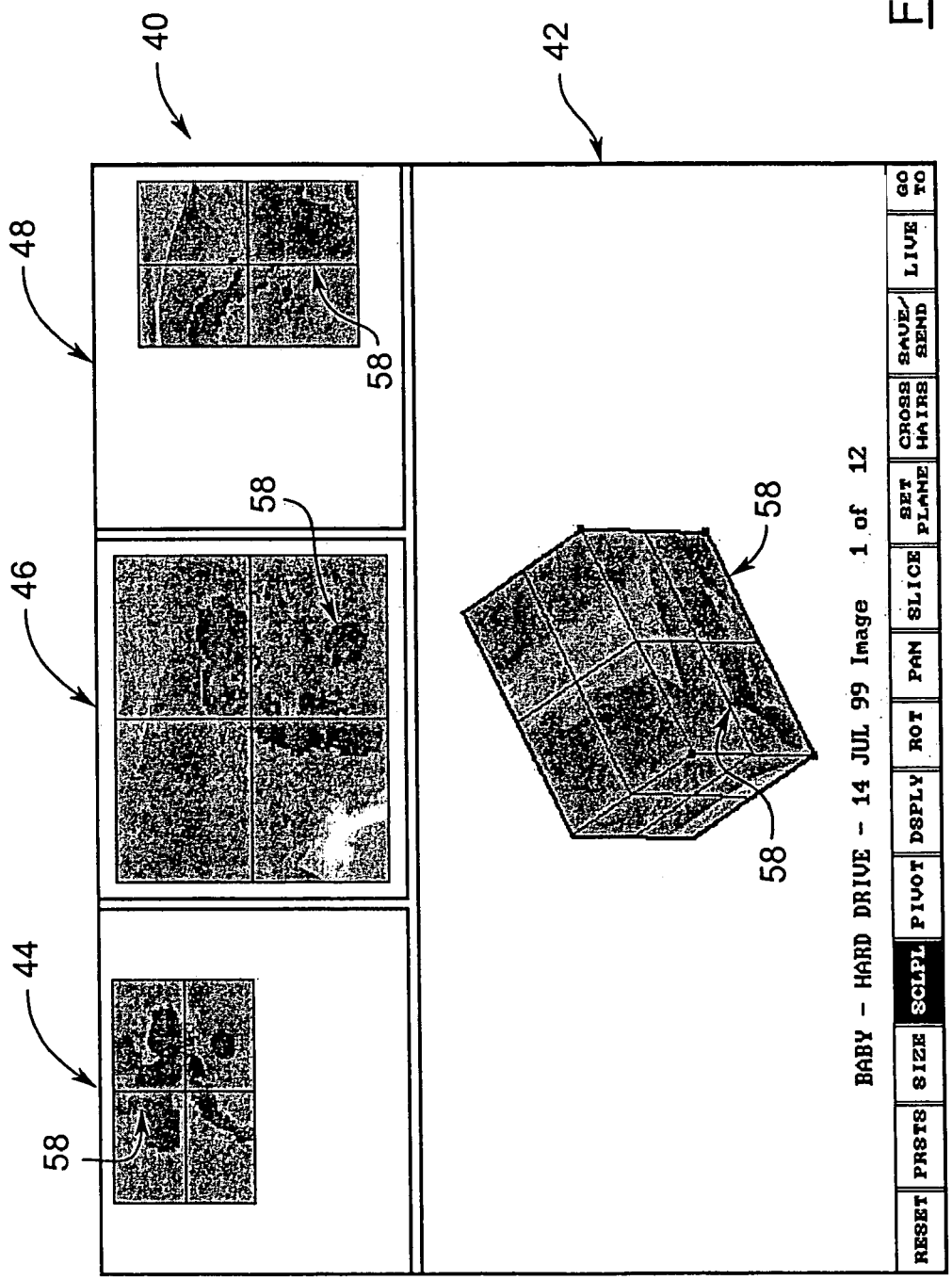
FIG. 6 is a screen shot showing features of a graphical interface for a system according to an aspect of the present invention.

In FIG. 6, the dark area 58 has expanded beyond the fetus' face 50 indicating that the region has leaked into unwanted artifacts, as shown in each of the sectional views 44, 46 and 48. Note the asymmetric growth of the dark area 58 due to the selected region meeting a threshold at various points in the three dimensional image space. Note also, in the volume view 42, that the dark area 58 appears in the visible plane, indicating that the region has reached the edge of the image space.

Figure 7:
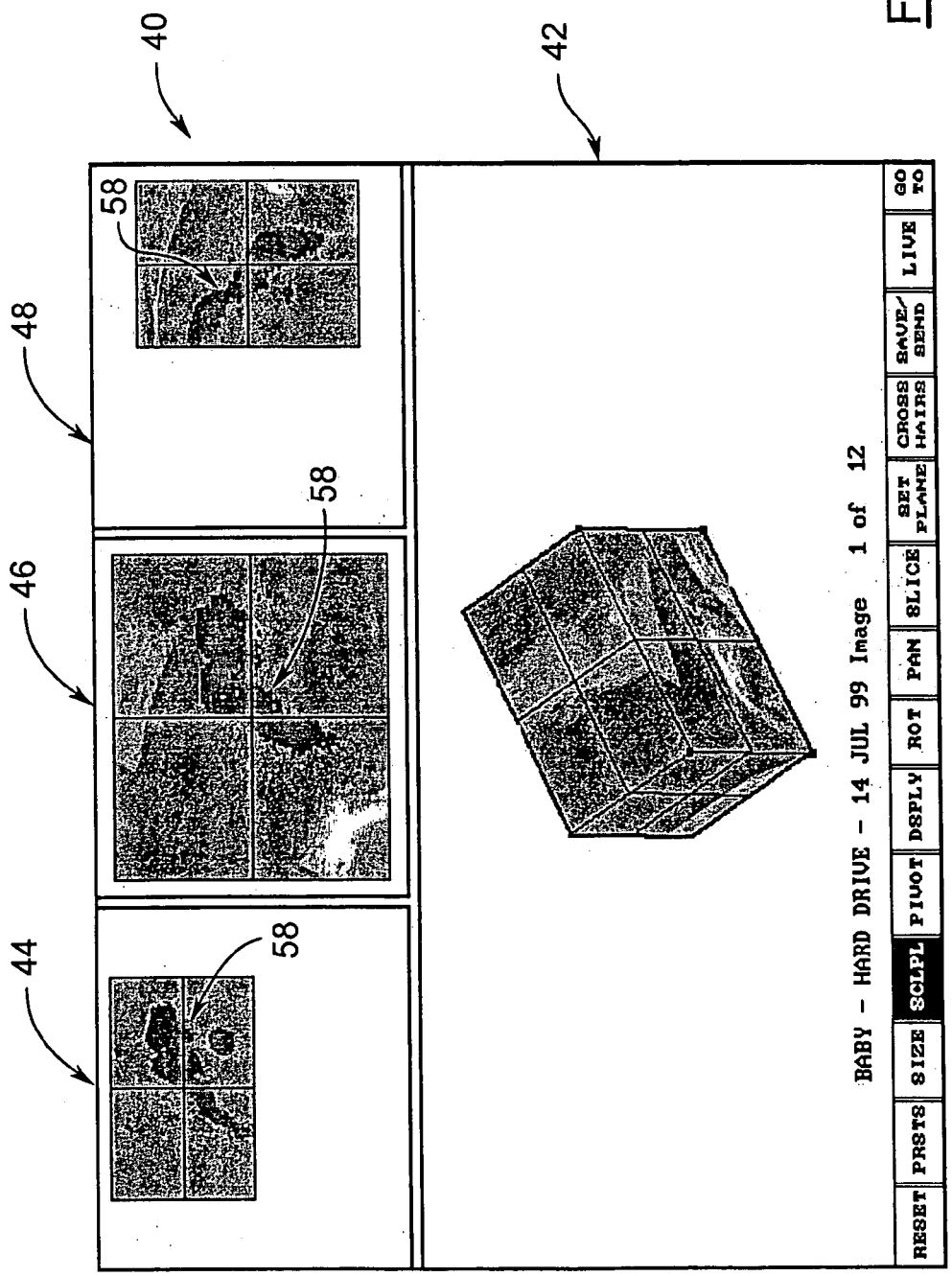
FIG. 7 is a screen shot showing features of a graphical interface for a system according to an aspect of the present invention.

The user recognizes that the region growing routine has performed too many iterations thereby causing growth of the selected region beyond the feature of interest, namely the face 50 of the fetus. Accordingly, the user physically retracts the mouse, causing a decrease in the iteration variable and a corresponding retraction in the region. By physically moving the mouse, the user may adjust the iteration variable, thereby extending or retracting the region, until an optimal region is reached. The optimal region selects as much of the feature of interest as is possible without selecting a significant number of points corresponding to unwanted artifacts. FIG. 7 shows a screen shot of the graphical interface 40 with the dark area 58 approximately covering the feature of interest in each of the sectional views 44, 46 and 48 without selecting a significant portion of the unwanted artifacts.

Figure 8:
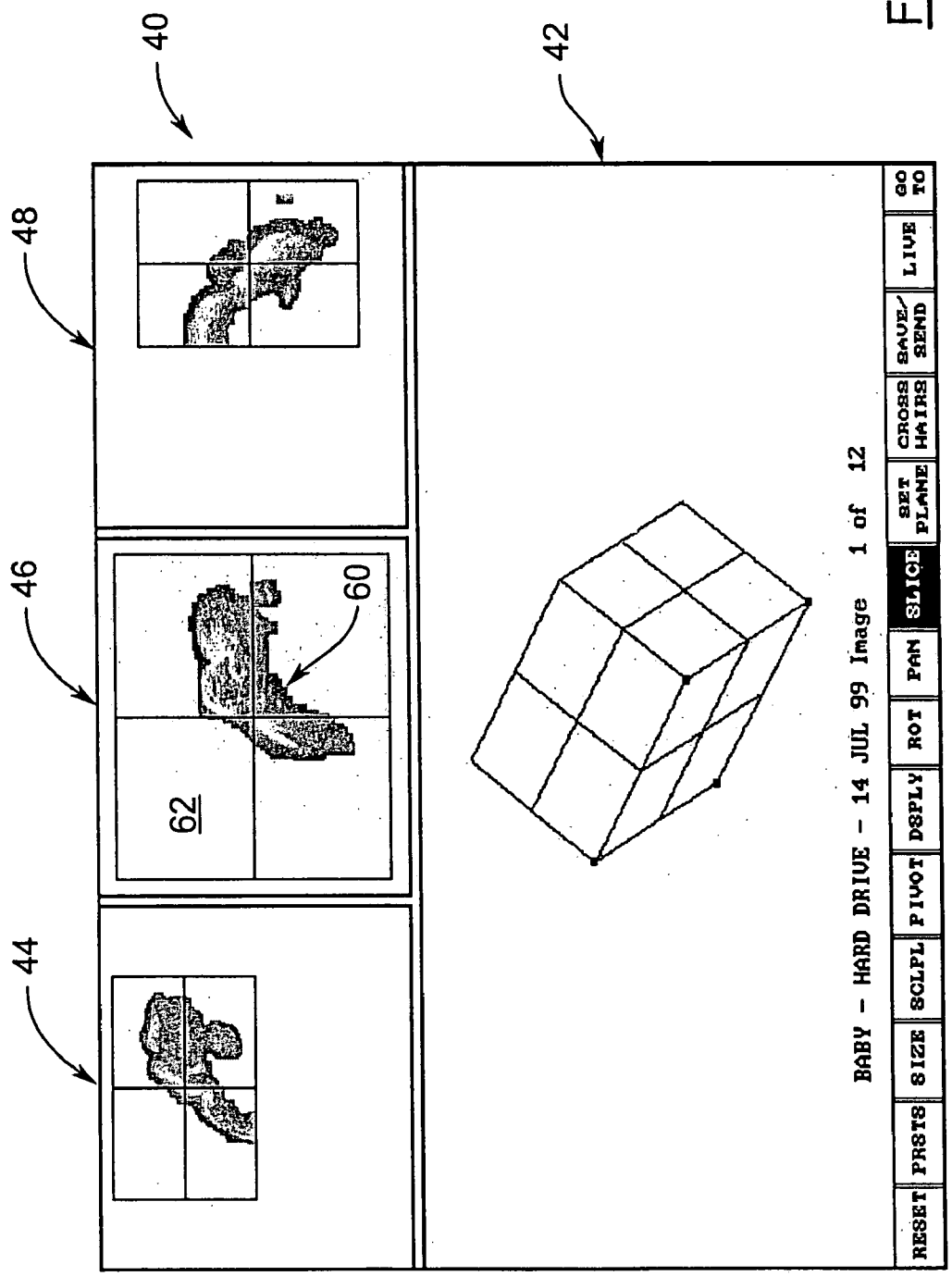
FIG. 8 is a screen shot showing features of a graphical interface for a system according to an aspect of the present invention.

Once the user is satisfied that the region growing has resulted in an optimal region, the system 22 will perform a scalpelling operation to remove all unselected areas of the image space. This operation is performed by applying the scalpelling matrix C as a mask to modelPoly. The scalpelling matrix C is updated from the growth matrix G so that the scalpelling matrix C selects only the coordinate points identified as members of the region. The resulting winPoly will contain only image data for the selected region. FIG. 8 shows a screen shot of the graphical interface 40 following the scalpelling operation. As shown in the sectional views

44, 46 and 48, the scalpelling has removed all image data in the unselected area 62 surrounding the selected region of interest 60. The visible faces of the rectangular volume in the volume view 42 show no image because the region selected did not capture any coordinate points within the visible planes, i.e. the outer edges of the image space.

Figure 9:
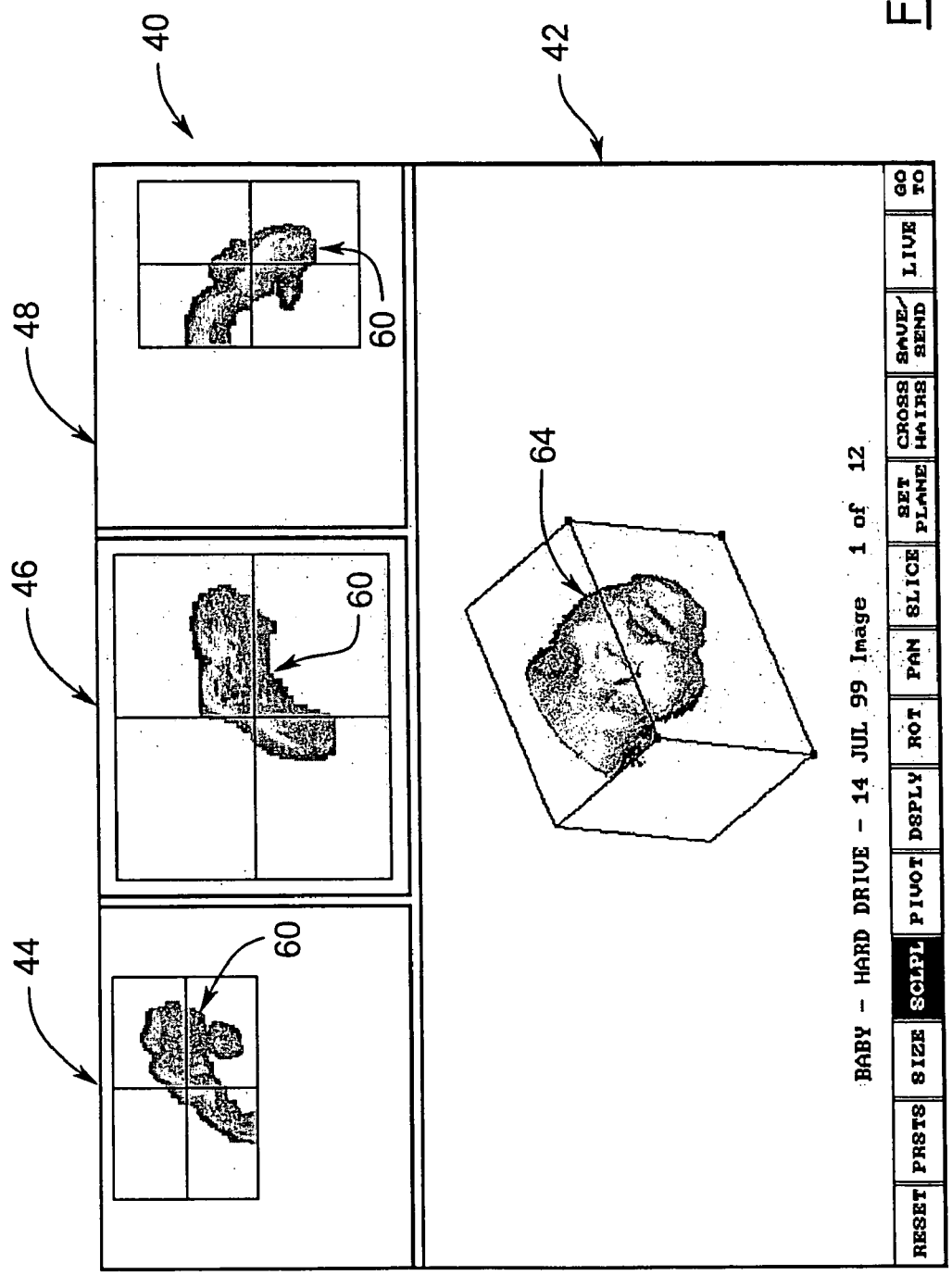
FIG. 9 is a screen shot showing features of a graphical interface for a system according to an aspect of the present invention.
Figure 10:
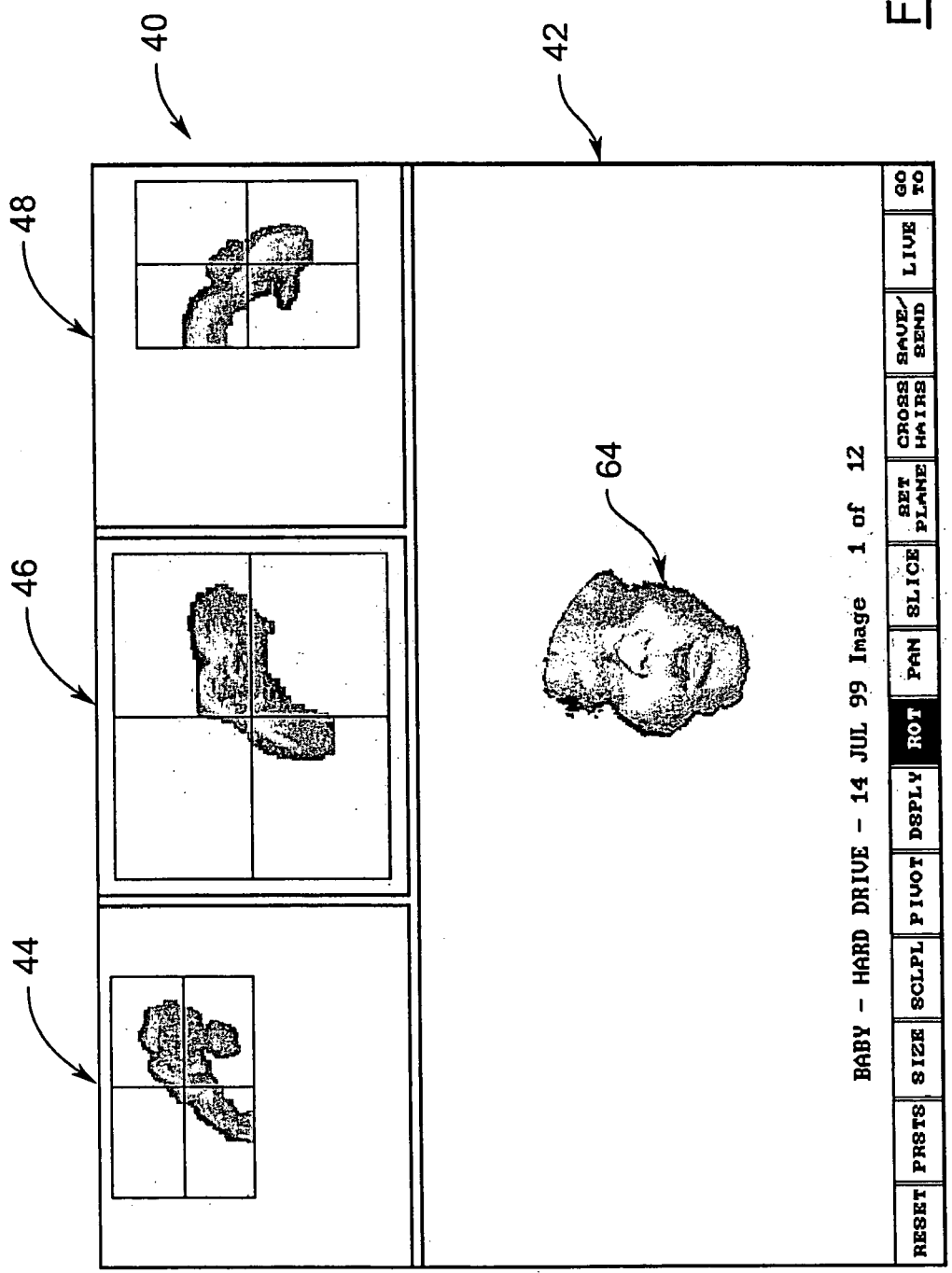
FIG. 10 is a screen shot showing features of a graphical interface for a system according to an aspect of the present invention; On page 6, after paragraph 21, please insert the following new paragraphs.

The volume view 42 may then be rendered to show the rendered image 64 of the selected region of interest 60, as depicted in the screen shot shown in FIG. 9. The user may then use all the existing features of the system 22 to rotate, scale or translate the rendered image 64 of the fetus' face, as shown in FIG. 10. A printing device may be attached to the computer system to print the rendered volume view 42.

In a further embodiment, the selected region is rendered in the volume view 42 at each iteration, allowing the user to monitor the growth of the region in that view as well. Reference is now made to FIGS. 11 through 17 which show a screen shot of the graphical interface 40 illustrating an embodiment of the invention wherein the selected region is rendered in the volume view 42 during the region growing process.

Figure 11:
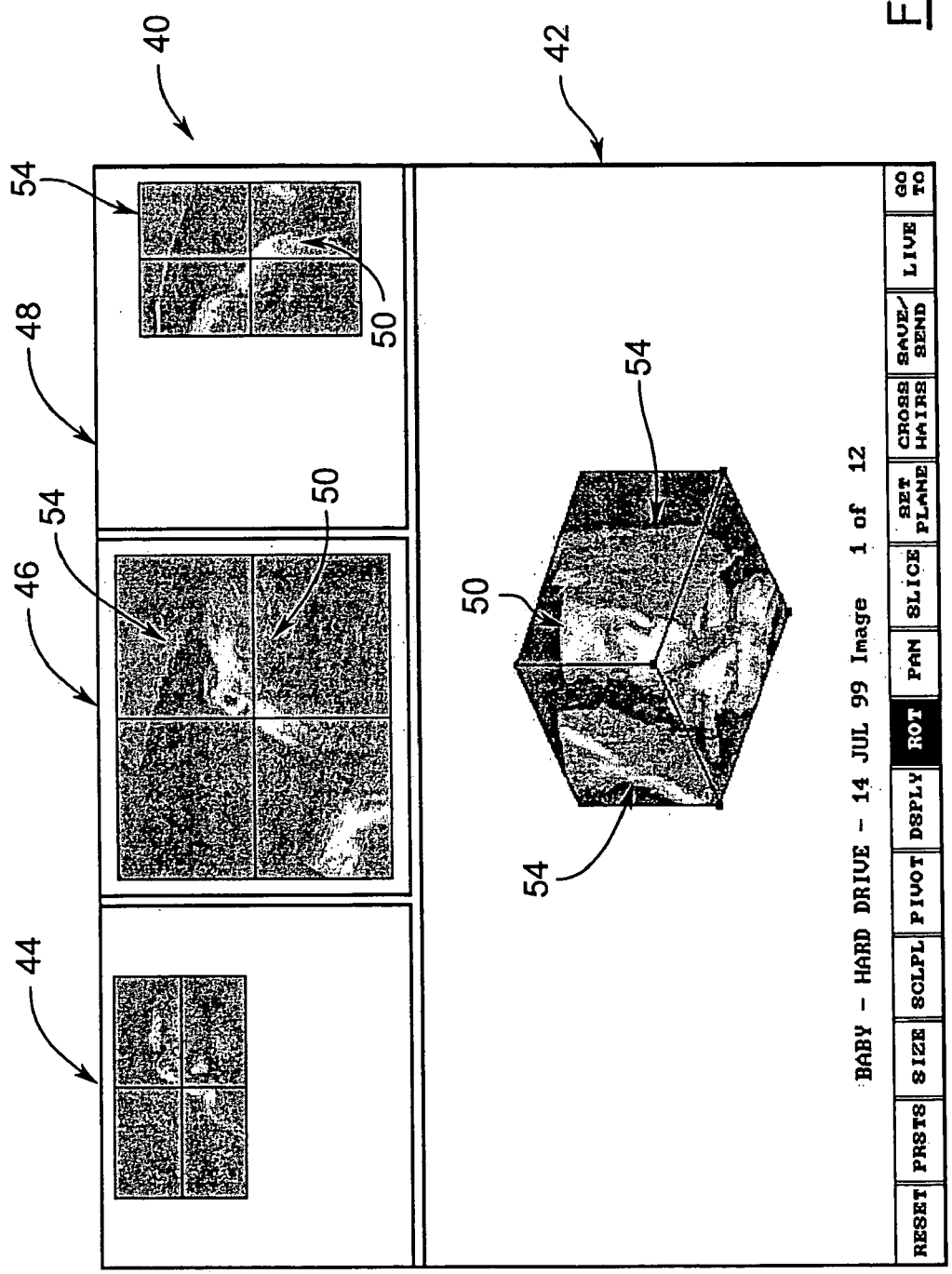
FIG. 11 is a screen shot of the graphical interface upon which is displayed the volume view of a fetal image and three orthogonal sectional views.

FIG. 11 shows a screen shot of the graphical interface 40 upon which is displayed the volume view 42 of the fetal image and the three orthogonal sectional views 44, 46 and 48. The fetus' face 50 and the uterus lining 54 are visible in the rendered volume view 42, wherein it will be appreciated that the uterus lining 54 partially obscures the fetus' face 50.

Figure 12:
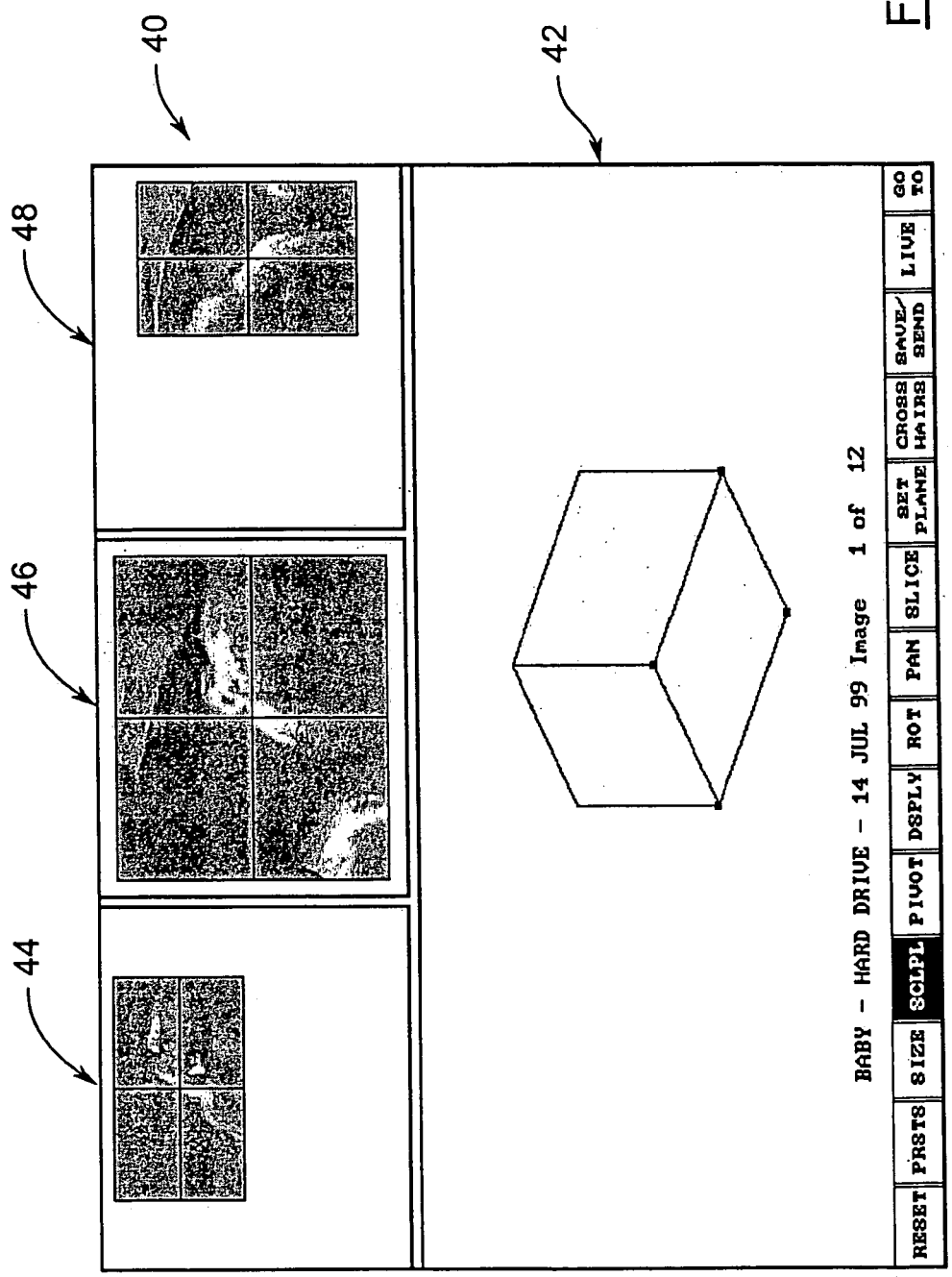
FIG. 12 shows the positioning of the mouse within one of the sectional views shown in FIG. 11.

Once again, the feature of interest that the user wishes to view is the fetus' face 50. Accordingly, the user positions the mouse pointer 56 within the area of the feature of interest in one of the sectional views 46, as shown in FIG. 12. The user then selects a seed point within the feature of interest using the mouse pointer 56. The selection of a seed point begins the region growing process. To begin with, the region consists solely of the seed point and thus the rendered image of the selected region in the volume view 42 begins as a single point.

Figure 13:
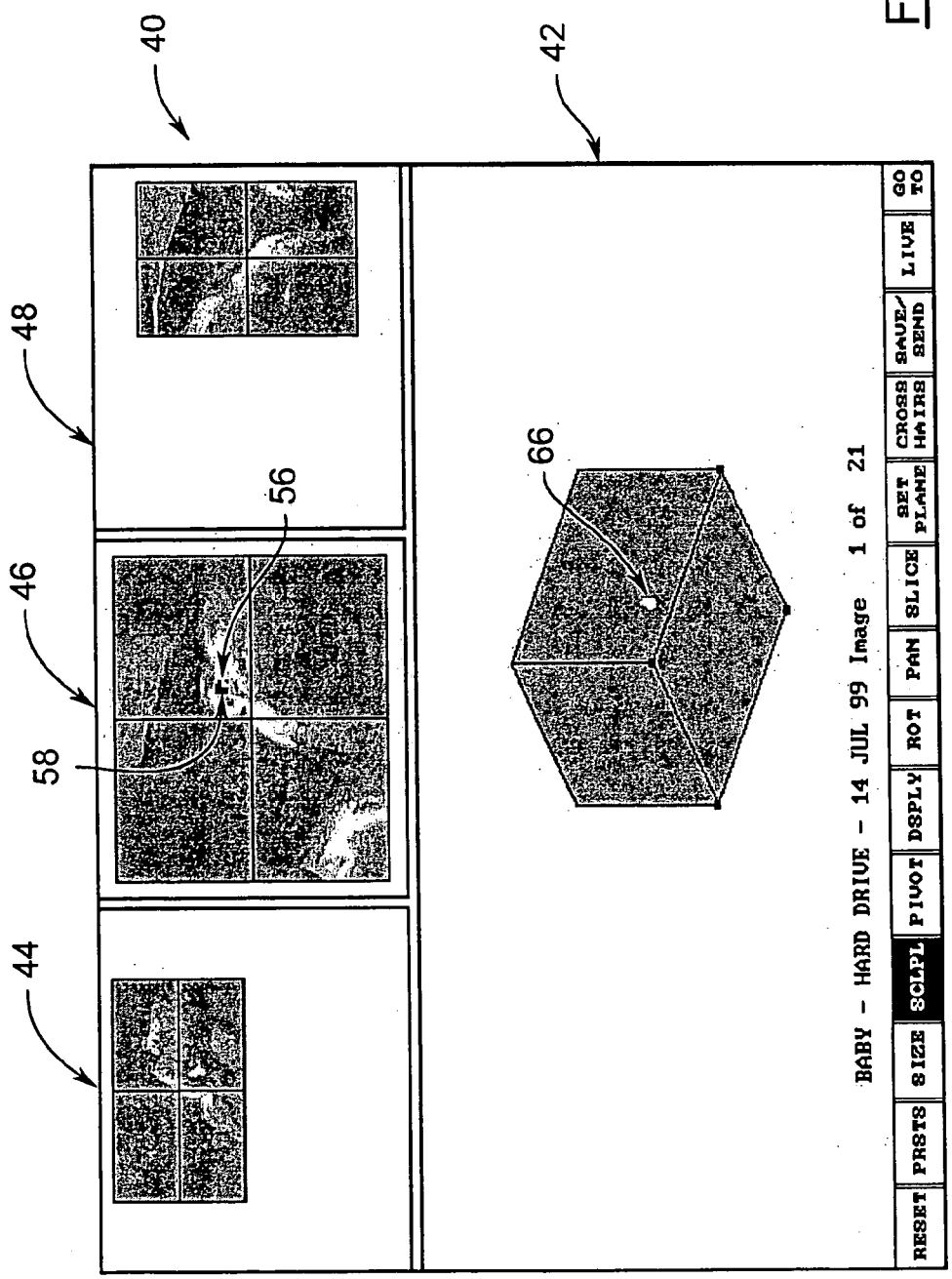
FIG. 13 is a screen shot of the graphical interface after the user has selected an area of interest and moved the mouse a small distance.

Reference is now made to FIG. 13 which shows a screen shot of the graphical interface 40 after the user has moved the mouse (not shown) a small distance. The mouse pointer 56 and a small dark area 58 representing the selected points of the region are visible in the x-y sectional view 46. A rendered view 66 of the selected region is shown in the volume view 42.

Figure 14:
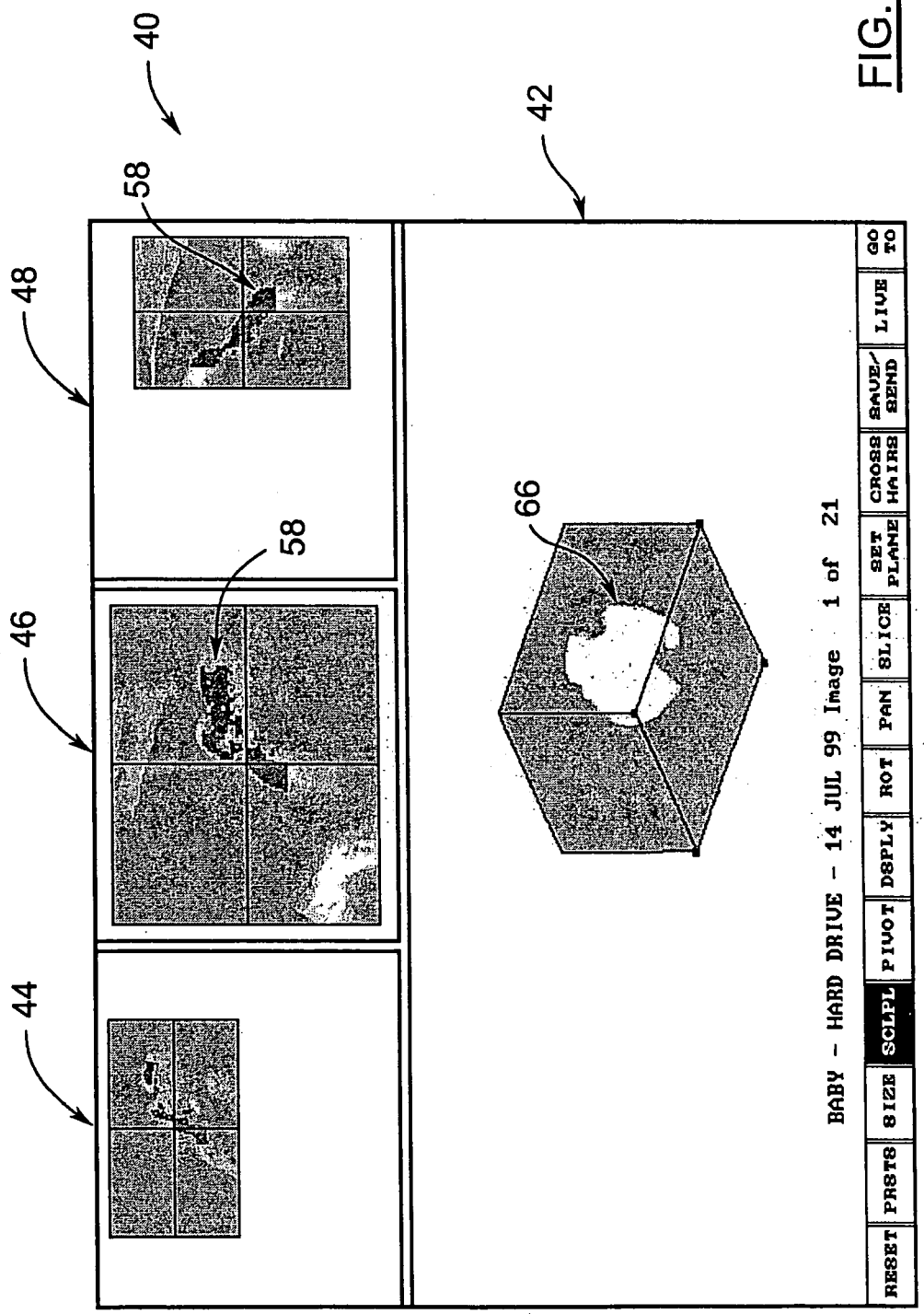
FIG. 14 is a screen shot showing the effect of the growing routine on the selected region upon further movement of the mouse.

With further movement of the mouse, the user causes the region growing routine to expand the selected region, and thus the dark area 58, as shown in FIG. 14. As described above, the growing dark area 58 corresponding to points of the selected region is visible and may be monitored by the user in the three sectional views 44, 46 and 48. In this embodiment, the growth of the region may also be monitored by the user through the rendered view 66 of the region shown in the volume view 42.

Figure 15:
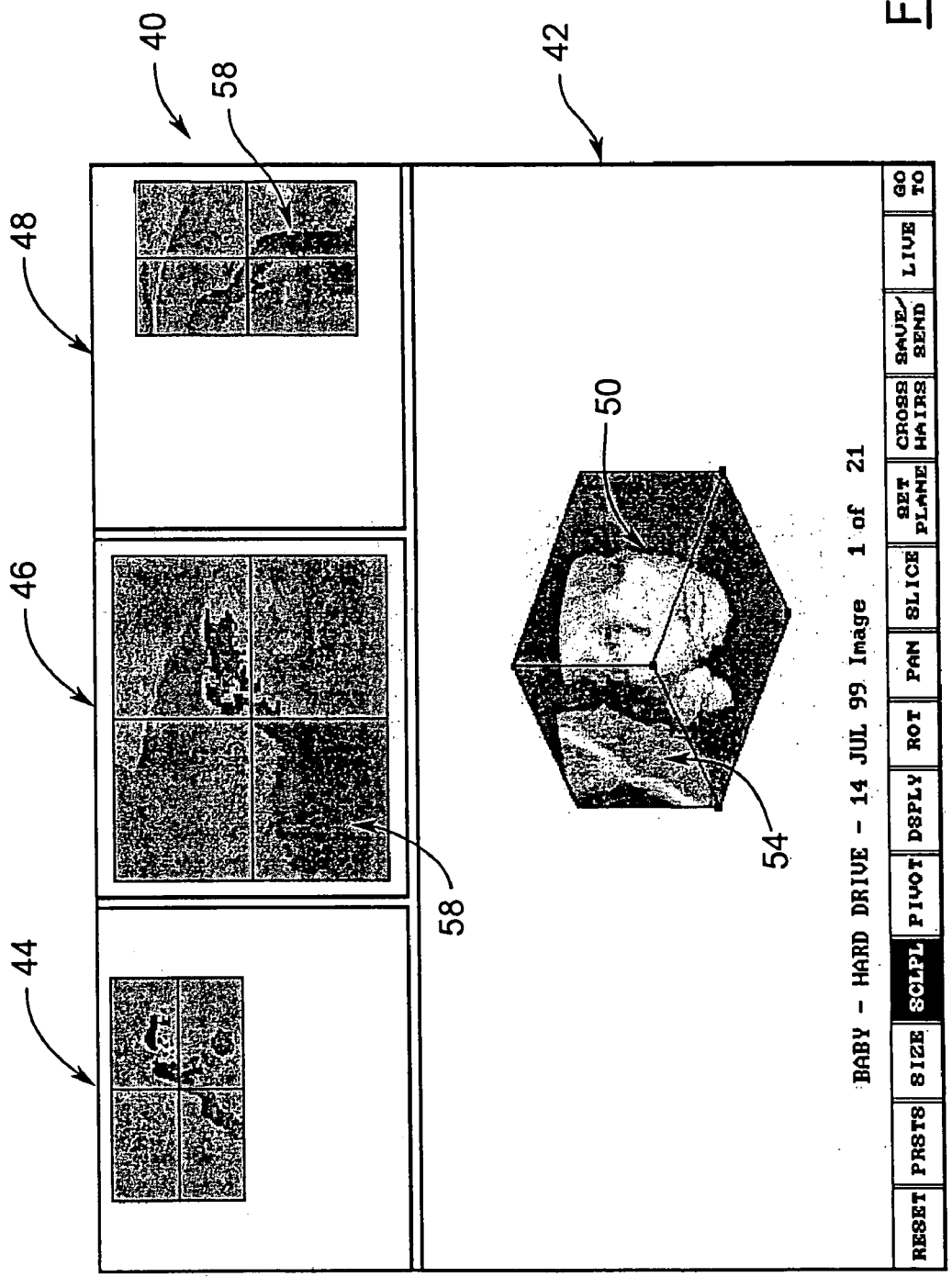
FIG. 15 is a screen shot of the graphical interface after the user has permitted the growth of the selected region to extend beyond the desired region of interest.

Reference is now made to FIG. 15, which shows a screen shot of the graphical interface 40 after the user permitted the growth of the region to extend beyond the desired region of interest. As shown in the sectional views 44, 46 and 48, the dark area 58 has extended into unwanted artifacts and features. This is also apparent to the user from the volume view 42 which shows a rendered view of the fetus' face 50 and the uterus lining 54.

Figure 16:
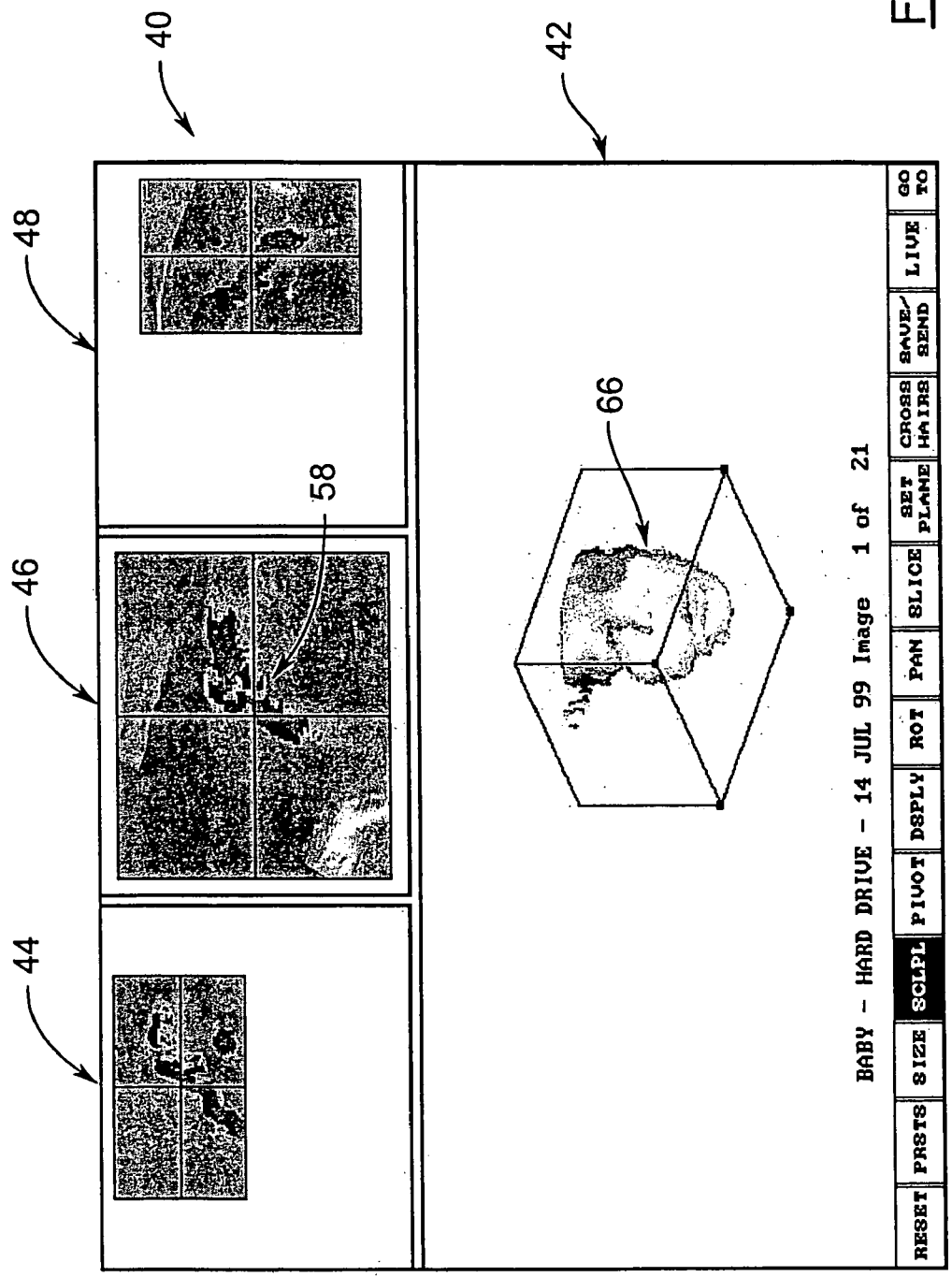
FIG. 16 is a screen shot of the graphical interface after the user manipulates the mouse to retract the selected region.
Figure 17:
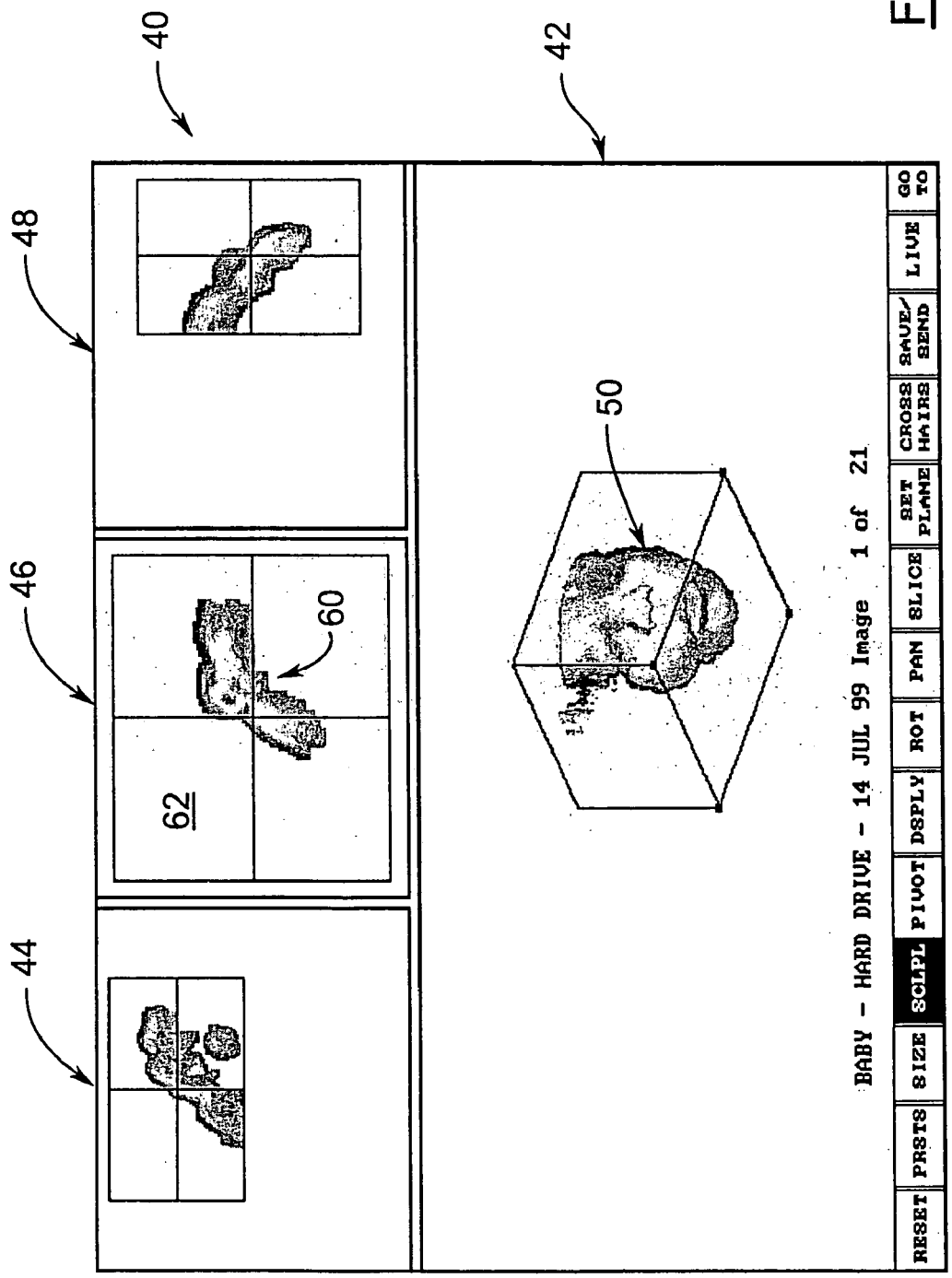
FIG. 17 is a screen shot of the graphical interface after unselected points are scalpelled away.

Accordingly, the user manipulates the mouse to cause the region to retract, as shown in FIG. 16. The volume view 42 showing the rendered view 66 of the selected region contains the fetus' face and some small amount of excess material. Once the user is satisfied with the selected region, the unselected points are scalpelled away and the remaining points are displayed, as shown in FIG. 17. In the volume view 42, the user has a clear and unobstructed rendered view of the fetus' face 50.

Although the embodiments of the subject invention described above involve the selection of a feature of interest using user-controlled region growing, and following which unselected areas are scalpelled away, those skilled in the art will understand that the subject invention may be implemented such that the selected region is scalpelled away and the unselected area is retained. In this alternative embodiment, the user selects an undesired feature of interest rather than a desired feature of interest. A user-controlled region is then grown within the undesired feature, following which the region is scalpelled away leaving the remainder of the image data, including the desired feature. Those skilled in the art will also understand that multiple seed points may be selected such that multiple regions are grown, either in succession or in parallel.

In addition to the particular embodiments described above, those skilled in the art will appreciate that the present invention may be implemented using various region growing techniques and various techniques for relating the manipulation of the input device to the extent of the region growth.

While the subject invention has been described such that the seed point is selected from a sectional view of a three dimensional image, it will be appreciated by those skilled in the art that alternative methods may be employed. For example, the seed point may be selected from the volume view.

It will also be appreciated that although the embodiment of the present invention described uses a Cartesian coordinate system for defining and manipulating the three dimensional images, other coordinate systems could be used. For example, one could use a circular cylindrical coordinate system or a spherical coordinate system.

Using the foregoing specification, the invention may be implemented as a machine, process or article of manufacture by using standard programming and/or engineering techniques to produce programming software, firmware, hardware or any combination thereof.

Any resulting program(s), having computer readable program code, may be embodied within one or more computer usable media such as memory devices, transmitting devices or electrical or optical signals, thereby making a computer program product or article of manufacture according to the invention. The terms "article of manufacture" and "computer program product" as used herein are intended to encompass a computer program existent (permanently, temporarily or transitorily) on any computer usable medium.

A machine embodying the invention may involve one or more processing systems including, but not limited to, central processing unit(s), memory/storage devices, communication links, communication/transmitting devices, servers, I/O devices, or any subcomponents or individual parts of one or more processing systems, including software, firmware, hardware or any combination or sub-combination thereof, which embody the invention as set forth in the claims.

One skilled the art of computer science will be able to combine the software created as described with appropriate general purpose or special purpose computer hardware to create a computer system and/or computer sub-components embodying the invention and to create a computer system and/or computer sub-components for carrying out the method of the invention.

Accordingly, it will be apparent that the present invention may be implemented in other specific forms without departing from the spirit or the essential characteristics thereof. In particular, while the invention has been described in the context of medical imaging generally, and ultrasound imaging in particular, it will be apparent to those skilled in the art that the invention is applicable in other imaging contexts. Additionally, while the invention has been described in connection with a user input device such as a manually operated computer mouse, it will be apparent to those skilled in the art that the invention may be implemented in connection with any other input device. The presently discussed embodiments are considered to be illustrative and not restrictive, the scope of the invention being indicated by the appended claims rather than the foregoing description, and all changes that come within the meaning and range of the claims are therefore intended to be embraced.

What is claimed is:

1. A method of selecting a portion of a 3D volume, the portion of the volume containing a feature of interest, a view of the volume being displayed on a display, the view being generated from a volume-defining array containing data corresponding to properties at points within a coordinate system containing the volume, the volume-defining array being stored by an image processing system, and a user having a user interface for interacting with the image processing system, the method comprising the steps of:
  a) determining a seed point in the volume defining array in response to the selection by the user of a pixel in the view of the volume being displayed; and
  b) growing a region in three-dimensions about said seed point, wherein said growing said region includes iteratively growing said region and the number of iterations performed is responsive to the user interface, such that manipulation of the user interface selectively determines the extent of the growth of said region.

2. The method defined in claim 1, wherein said step of growing said region comprises an iterative series of steps, the steps comprising:
  evaluating an untested point in the volume defining array adjacent to a boundary member point to determine if the untested point is a member of said region, said boundary member point being said seed point for a first iteration and said boundary member point being a member point at the boundary of said region for subsequent iterations;
  adding to said region the untested points that are determined to be members of said region;
  excluding from said region the untested points that are determined not to be members of said region; and
  visually distinguishing, on the view of the volume being displayed, the points determined to be members of said region from other points.

3. The method defined in claim 1, wherein said view of the volume being displayed comprises a sectional view of said 3D volume and the method further comprising the step, prior to step (a), of displaying said sectional view in response to user selection of a sectional plane through said 3D volume.

4. The method defined in claim 3, wherein said sectional view includes a portion of said feature of interest, and wherein said pixel selected by the user for determining a seed point comprises a pixel located within the feature of interest.

5. The method defined in claim 2, wherein said step of visually distinguishing comprises blacking out the pixels in said view corresponding to points in the volume defining array determined to be member points of said region.

6. The method defined in claim 5, wherein manipulation of the user interface causes a decrease in said number of iterations performed, and wherein in response thereto said region is retracted and said blacking out is removed from pixels corresponding to former member points of said region.

7. The method defined in claim 6, wherein said blacking out comprises the application of a mask to said volume defining array, said mask comprising a three dimensional array, the entries of said mask indicating the member status of each point in the volume defining array.

8. The method defined in claim 1, wherein the user interface has an initial position, and wherein subsequent thereto the user interface may be displaced from said initial position, said displacement causing the extent of the region to be expanded.

9. The method defined in claim 8, wherein retraction of the user interface towards said initial position causes the extent of the region to be retracted.

10. The method defined in claim 8, wherein said user interface comprises a computer mouse.

11. The method defined in claim 1, wherein said data is ultrasound data.

12. The method defined in claim 1, wherein said user interface comprises a device selected from the group comprising a keyboard, a mouse, a trackball, a touch pad, a microphone and a pen.

13. An image processing system for selecting a portion of a 3D volume, the portion of the volume containing a feature of interest, a view of the volume being displayed on a display, the view being generated from a volume-defining array containing data corresponding to properties at points within a coordinate system containing the volume, the volume-defining array being stored by the image processing system, a seed point in the volume defining array being determined based upon the selection by a user of a pixel in the view of the volume being displayed, the image processing system comprising:
  (a) a user interface for selecting said pixel and for selectively determining the extent of the growth of a region; and
  (b) region growing module for growing said region in three-dimensions about the seed point, said region growing module increasing and decreasing the growth of said region performed in response to manipulation of said user interface;
  wherein the view of the volume being displayed shows the size of said region and
  said region growing module performs an iterative series of steps, each iteration expanding the growth of said region, and the number of iterations performed is responsive to the user interface, such that manipulation of the user interface selectively determines the extent of the growth of said region.

14. The image processing system as defined in claim 13, wherein said view of the volume being displayed on the display comprises a sectional view of said 3D volume, the system further including a view selection module, said view selection module being responsive to user selection of a sectional plane through said three dimensional volume.

15. The image processing system as defined in claim 14, wherein said region growing module further includes a mask component for blacking out pixels in said sectional view corresponding to the points in the volume defining array determined to be members points of said region.

16. The image processing system defined in claim 13, wherein said user interface has an initial position and wherein displacement of said user interface from said initial position causes the extent of growth performed by said region growing module to be increased.

17. The image processing system defined in claim 16, wherein the extent of growth performed is decreased in response to retraction of said user interface towards said initial position.

18. The image processing system defined in claim 17, wherein said user interface composes a computer mouse.

19. The image processing system defined in claim 13, wherein said data is ultrasound data.

20. A computer program product comprising a computer readable medium carrying program means for selecting a portion of a volume, the portion of the volume containing a feature of intrest, a view of the volume being displayed on a display, the view being generated from a volume-defining array containing data corresponding to properties at points within a coordinate system containing the volume, the volume-defining array being stored by an image processing system, and a user having a user interface for interaction with the image processing system, the computer program product comprising:
  code means for determining a seed point in the volume defining array in response to the selection by the user of a pixel in the view of the volume being displayed; and
  code means for growing a region about said seed point, wherein the growth of said region is responsive to the user interface, such that manipulation of the user interface selectively determines the extent of the growth of said and wherein said growing said region includes iteratively growing said region into adjacent voxels meeting member criteria, and wherein a number of iterations is selectively adjusted by the user through the user interface.

21. The computer program product defined in claim 20 wherein the computer readable medium composes a medium selected from the group comprising a modulated electrical signal, a modulated optical signal, a magnetic storage medium and an optical storage medium.

22. The method defined in claim 20, further including a step of displaying, at each iteration, the extent of the growth of said region.

23. The method defined in claim 22, wherein the view of the volume being displayed includes at least one sectional view of the volume and said step of displaying includes displaying the extent of the growth of said region within said sectional view.

24. The image processing system claimed in claim 13, wherein said region growing module iteratively grows said region into adjacent voxels meeting member criteria, and wherein said user interface selectively adjusts a number of iterations performed by said region growing module.

25. The image processing system claimed in claim 24, further including a display module for displaying, at each iteration, the extent of the growth of said region.

26. The image processing system claimed in claim 25, wherein the view of the volume being displayed includes at least one sectional view of the volume and said display module displays the extent of the growth of said region within said sectional view.

* * * * *